United States Patent [19]
Shibata

[11] Patent Number: 4,698,776
[45] Date of Patent: Oct. 6, 1987

[54] RECORDING/REPRODUCING APPARATUS

[75] Inventor: Izumi Shibata, Tokyo, Japan

[73] Assignee: Kabushiki Kaisha Kenwood, Japan

[21] Appl. No.: 613,173

[22] Filed: May 23, 1984

[30] Foreign Application Priority Data
May 30, 1983 [JP] Japan .................................. 58-94194
Jul. 12, 1983 [JP] Japan ................................. 58-125420

[51] Int. Cl.⁴ .............................................. G10L 5/00
[52] U.S. Cl. .................................. 364/513.5; 381/46;
381/36; 365/45
[58] Field of Search ................. 364/513.5; 381/32, 46,
381/36; 365/45

[56] References Cited
U.S. PATENT DOCUMENTS
4,121,058 10/1978 Jusko et al. ............................ 381/32
4,318,188 3/1982 Hoffmann .............................. 365/45
4,429,367 1/1984 Ikeda ..................................... 381/51
4,577,252 3/1986 Kobayashi ......................... 360/72.2

Primary Examiner—E. S. Matt Kemeny
Attorney, Agent, or Firm—Gerald J. Ferguson, Jr.;
Michael P. Hoffman; Ronni S. Malamud

[57] ABSTRACT

There is provided an apparatus which automatically records and reproduces. The digital signal based on the acoustic signal is stored in memory means due to the operation of write control means in response to the recording instruction. When the recording is not instructed, the digital signal stored is read out due to the operation of readout control means, and the acoustic signal is reproduced from this digital signal.

1 Claim, 13 Drawing Figures

RECORDING/REPRODUCING APPARATUS

BACKGROUND OF THE INVENTION

1. Field of the Invention

The present invention relates to a recording/reproducing apparatus using a read/write memory means (hereinbelow, referred to as an RAM) as a memory medium.

2. Description of the Prior Art

In case of practicing a pronunciation of a foreign language and the like by a conventional magnetic recording/reproducing apparatus, a pronunciation of the learner himself is once recorded and then it is reproduced or played back for comparison.

However, to perform the above operations by the conventional magnetic recording/reproducing apparatus, it is necessary to repeat the operations for (a) recording a voice of himself; (b) rewinding a magnetic tape by a predetermined length; and (c) playing back the magnetic tape, etc. Therefore, there is a drawback such that those operations are troublesome.

SUMMARY OF THE INVENTION

It is an object of the present invention to provide a recording/reproducing apparatus which can automatically record and reproduce without requiring the manual rewinding and playback operations.

The above object is accomplished by a recording/reproducing apparatus comprising: A/D converter means for converting an input analog signal into a digital signal; memory means for storing the digital signal; and D/A converter means for converting the digital signal which was read out from the memory means into the analog signal. This apparatus stores the digital signal into the memory means in response to an instruction for the recording and reads out the signal stored in the memory means when no instruction for the recording is entered.

Another object of the present invention is to provide a recording/reproducing apparatus in which the unrecorded portion is not played back. For this purpose, after the completion of the write instruction, the memory content of the memory means is read out from the initial address when the write instruction was made to the last address.

Still another object of the invention is to provide a recording/reproducing apparatus which prevents that the playback operation is started while the learner is pronouncing to record. For this purpose, even when the acoustic signal data was written into the whole acoustic signal data memory area, the apparatus does not immediately enter the playback mode but starts the playback only when the end of recording instruction is entered.

DETAILED DESCRIPTION OF THE PREFERRED EMBODIMENTS

A constitution of a first embodiment of the present invention will be described in conjunction with FIG. 1.

The present invention is provided with A/D converter means 1 for converting an input analog audio signal (hereinbelow, referred to as an acoustic signal) into a digital signal (hereinbelow, referred to as an acoustic signal data), an RAM 2 for storing the acoustic signal data converted by the A/D converter means 1, and D/A converter means 3 for converting the acoustic signal data read out from the RAM 2 into the analog signal. There are further provided recording instruct means 4 for instructing the recording, write control means 5 for sequentially outputting an address signal and a write instruction signal to the RAM 2 in response to an output of the recording instruct means 4 and for instructing the write, and recording end time detecting means 6 for detecting either signal to be generated early between the signal representing the completion of the storage of the acoustic signal data into the entire memory capacity of the RAM 2 and the signal indicating the instruction of end of recording by the recording instruct means 4, thereby allowing the write control means 5 to finish instructing the writing in response to a detection output. The recording instruction by the recording instruct means 4 is sensed by the write control means 5 and the acoustic signal data from the A/D converter means 1 is sequentially stored in the RAM 2 in response to the address signal and write instruction signal which were sequentially output from the write control means 5. This storing operation is continued until the recording end time detecting means 6 generates an output.

Furthermore, in the invention, there are provided recording end address memory means 7 for storing a write address of the RAM 2 at the end of write instruction by the write control means 5, and readout control means which sequentially outputs the address signal and readout instruction signal to the RAM 2 after the completion of the write instruction by the write control means 5 and which instructs to read out from the initial write address by the write control means 5 to the last address stored in the recording end address memory means 7. Upon completion of the writing of the acoustic signal data into the last address, the readout control means 8 sequentially outputs the address signal and readout instruction signal to the RAM 2. The acoustic signal data stored is sequentially read out from the RAM 2 and is supplied to the D/A converter means 3, where it is converted into the analog signal. In this case, the acoustic signal data is read out from the RAM 2 from the initial write address by the write control means 5 to the last address stored in the recording end address memory means 7.

A practical example will now be described hereinbelow with respect to one embodiment of the invention.

Figure 1:
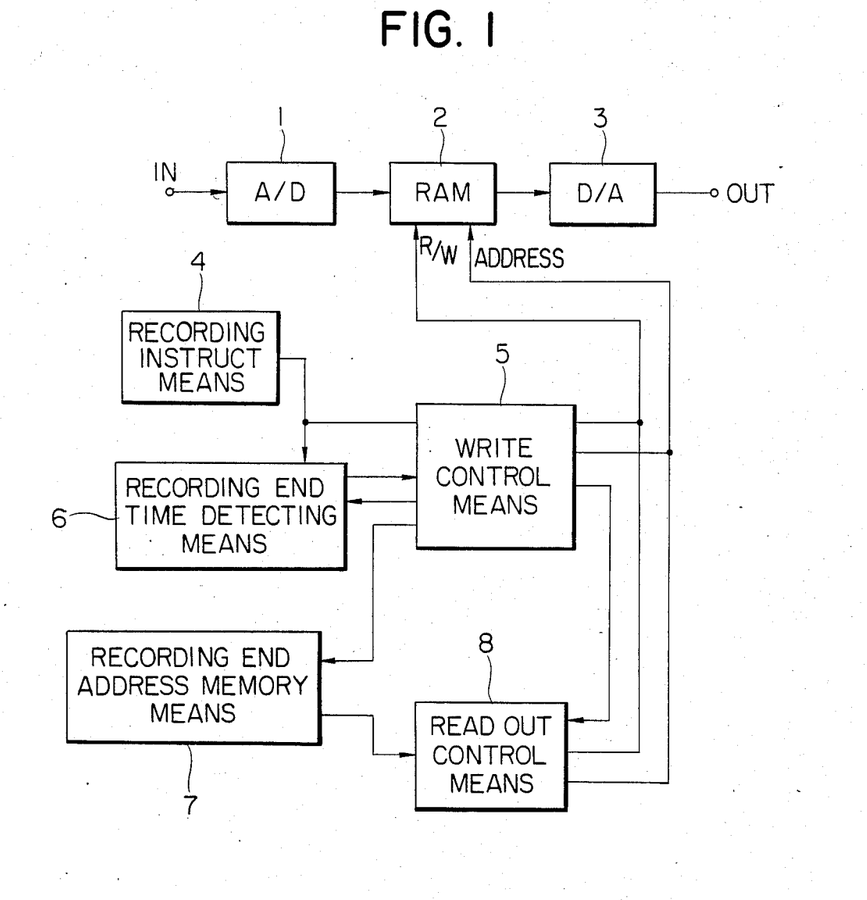
FIG. 1 is a function block diagram of one embodiment of the present invention.
Figure 2:
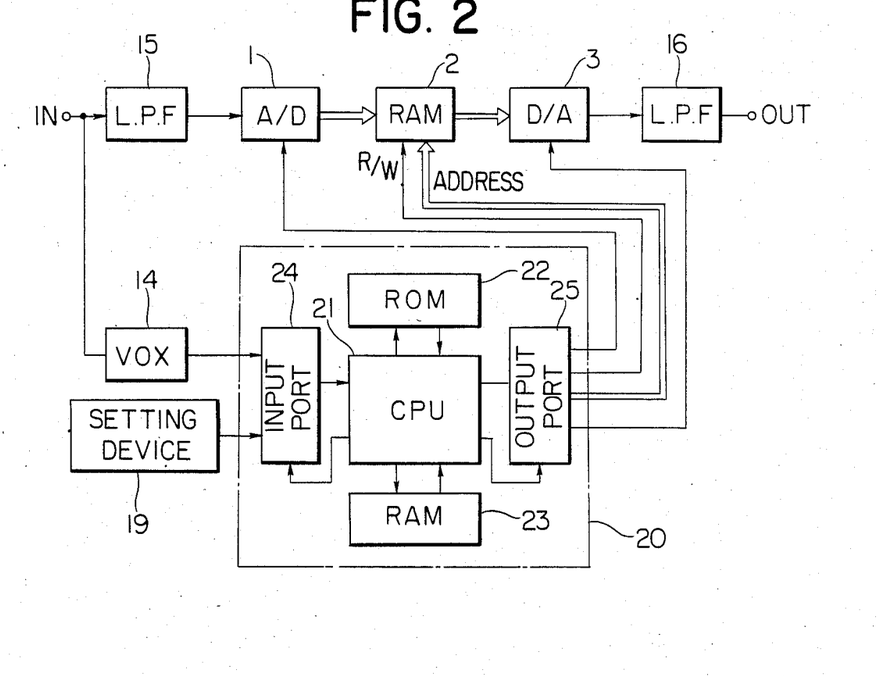
FIG. 2 is a block diagram showing a constitution of one embodiment of the invention.

FIG. 2 is a block diagram showing a constitution of the embodiment shown in FIG. 1.

The acoustic signal supplied to an input terminal IN is supplied to the A/D converter 1 through a low pass filter 15 to remove the foldover noise to be caused due to the sampling. This signal is converted into the acoustic signal data by the A/D converter 1 and then is supplied to the RAM 2.

The acoustic signal data stored in the RAM 2 is read out from the RAM 2 is supplied to the D/A converter 3, where it is converted into the analog signal. The analog signal output from the D/A converter 3 is transmitted to an output terminal OUT through a low pass filter 16.

On the other hand, a block 20 is a microcomputer which is fundamentally constituted by a CPU 21, an ROM 22, an RAM 23, an input port 24, and an output port 25. The acoustic signal supplied to the input terminal IN is supplied to a detecting circuit, i.e., a VOX circuit 14 to detect the presence of the acoustic signal. An output of the VOX circuit 14 and the set data of a setting device 19 to set the number of reproducing or playback times are supplied to the input port 24. A program to control the CPU 21 has been written in the ROM 22. The CPU 21 reads an output of the detecting circuit 14 and the set data of the setting device 19 if necessary through the input port 24 in accordance with the program in the ROM 22. Then, the CPU 21 performs the reception/transmission of the data with the RAM 23, arithmetic operation, and comparison. In dependence upon the necessity and in response to the results of comparison and arithmetic operation, the CPU 21 transmits through the output port 25 a conversion instruction signal to the A/D converter 1; a write instruction signal, a readout instruction signal and an address signal to the RAM 2; and a conversion instruction signal to the D/A converter 3, respectively.

Figure 3A:
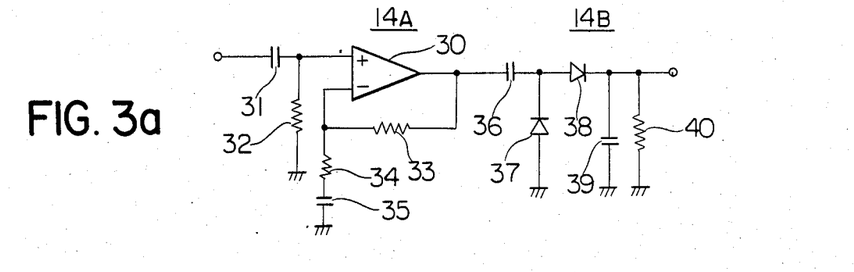
FIG. 3(a) is a circuit diagram showing an example of an acoustic signal detecting circuit.

FIG. 3(a) is a circuit diagram showing an example of the detecting circuit 14.

The detecting circuit 14 comprises: an amplifier 14A consisting of an operational amplifier 30, capacitors 31, 35, and resistors 32, 33, and 34; and a rectifying circuit 14B which consists of diodes 37, 38, capacitors 36, 39, and a resistor 40 and which doubles and rectifies an output voltage from the amplifier 14A.

Figure 3B:
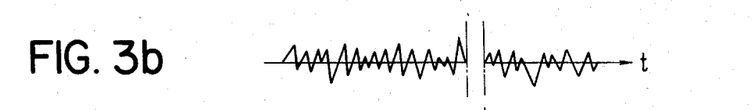
FIGS. 3(b) and 3(c) are waveform diagrams which are used to describe the operation of the detecting circuit shown in FIG. 3(a)
Figure 3C:
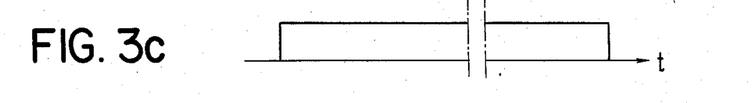

The detecting circuit 14 amplifies the acoustic signal supplied to the input terminal IN by the amplifier 14A. The acoustic signal amplified by the amplifier 14A is doubled and rectified by the rectifying circuit 14B and is output. Therefore, as shown in FIG. 3(b), from the time when the acoustic signal was supplied to the input terminal IN to the time when the supplying of the acoustic signal is stopped, the detecting circuit 14 generates an output at a high potential as shown in FIG. 3(c). In this embodiment, the time when the output of the detecting circuit 14 becomes a high potential corresponds to the recording start instruction, and the time when the output of the detecting circuit 14 becomes a low potential corresponds to the recording end instruction.

In this embodiment, the acoustic signal detecting circuit 14 is used as the recording instruct means 4; however, a switch may be used in place of this detecting circuit 14. In this case, one contact of the switch is connected to a power source +B through a pull-up resistor and the other contact is grounded, so that an output from a movable member may be supplied to the input port 24. In such a case, the time when the output from the movable member of the switch is at a high potential corresponds to the recording instruction.

Figures 4, 4B:
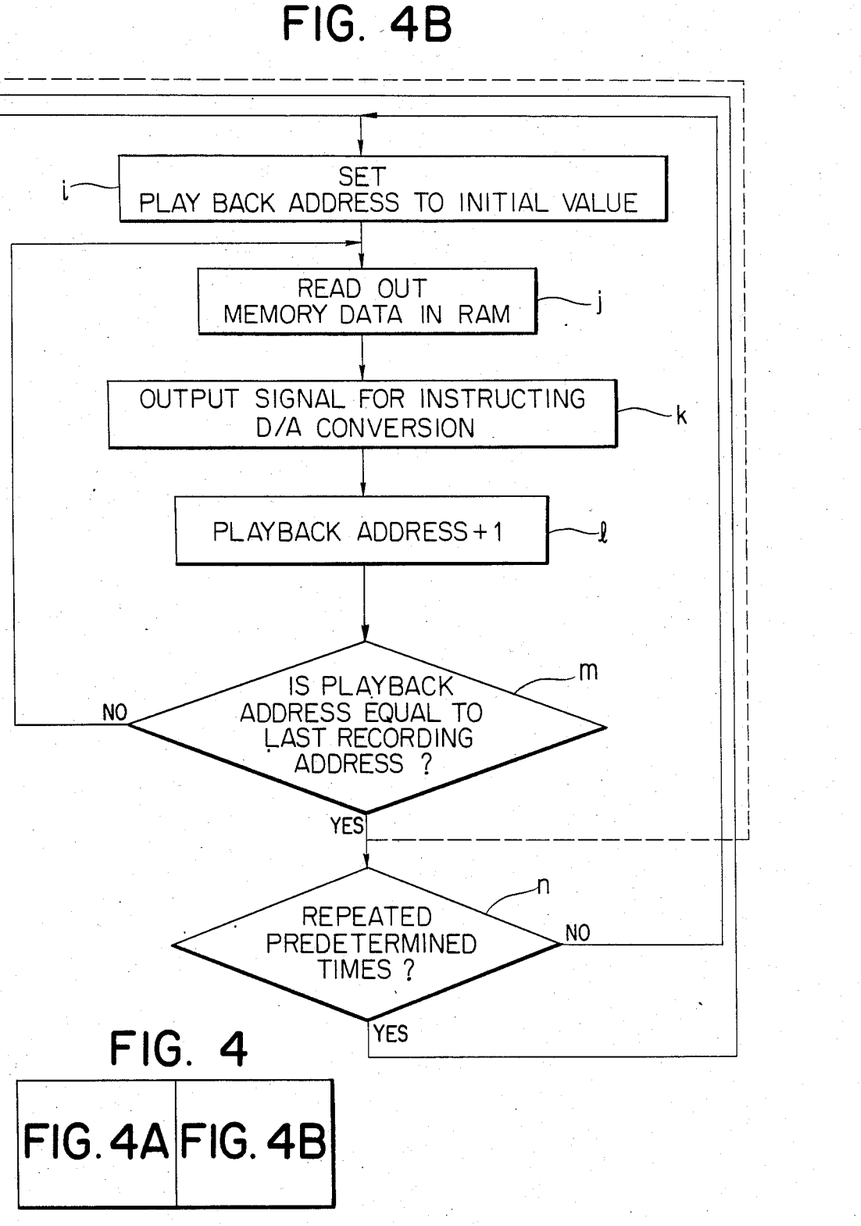
FIG. 4 composed of FIGS. 4A and 4B, is a flowchart to describe the operations of an embodiment of the present invention.
Figure 4A:
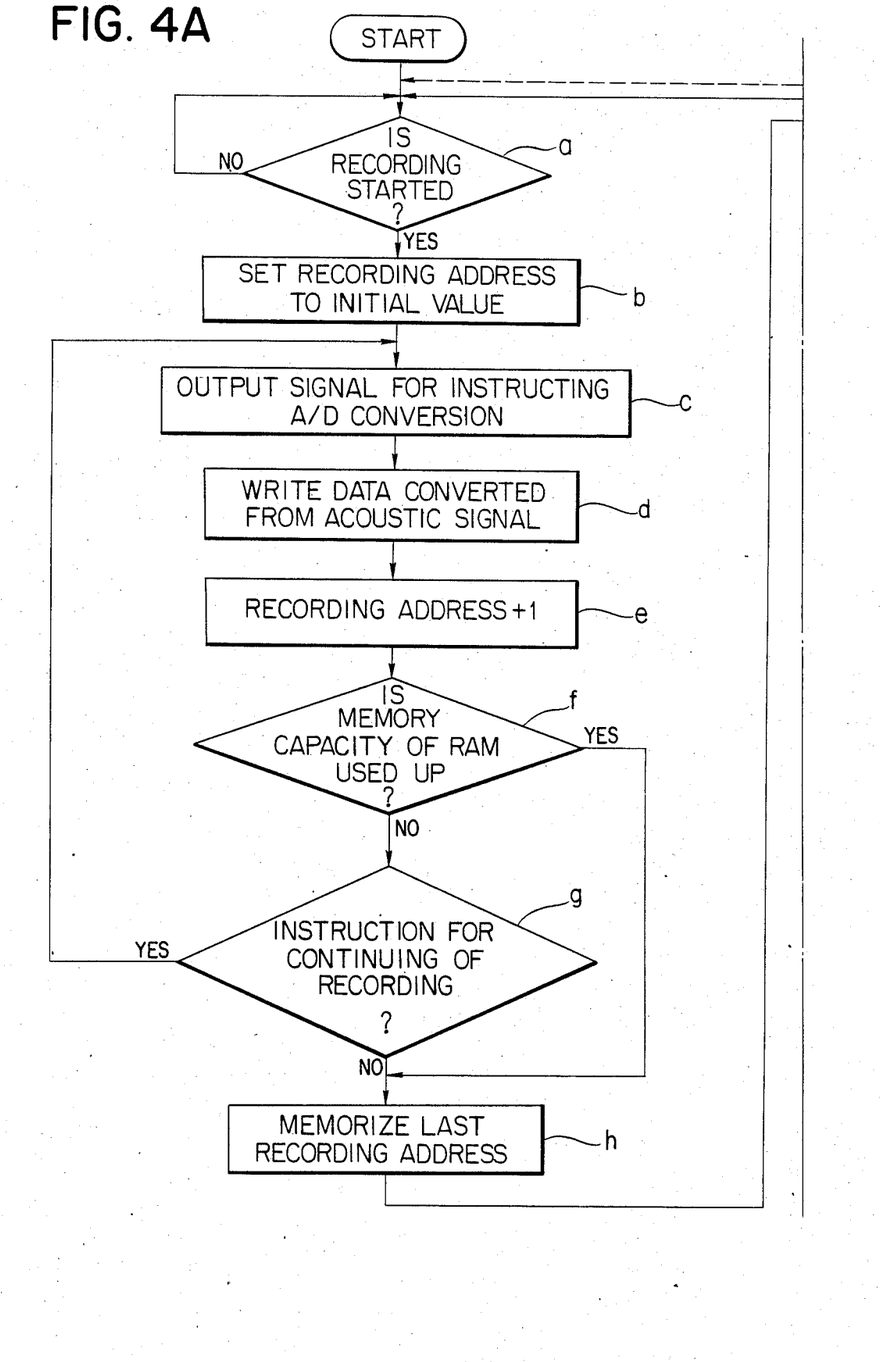

The operation in one embodiment of the present invention which is constituted in the manner as described above will be described with reference to the flowchart shown in FIG. 4.

The address memory area for the RAM 2 and the recording last address memory area have been set in respective predetermined addresses in the RAM 23.

When the program which has been written in the ROM 22 is operated, the apparatus stands by until the recording start instruction signal from the detecting circuit 14 is generated, namely, until the acoustic signal is supplied to the detecting circuit 14 and the output of the detecting circuit 14 becomes a high potential (step a). When the output of the detecting circuit 14 becomes a high voltage, a recording address initial value is stored into the address memory area for the RAM 2 in the RAM 23 (step b). Subsequently to step b, the conversion instruction signal is output to the A/D converter 1 (step c). After the A/D converter 1 received the conversion instruction signal, it samples the acoustic signal which was input through the low pass filter 15 and converts into the acoustic signal data. After step c, the content of the address memory area for the RAM 2 is output as the address signal to the RAM 2, then the write instruction signal is output to the RAM 2 (step d). Therefore, the acoustic signal data converted by the A/D converter 1 is stored in the address of the RAM 2 which was designated in response to the memory content of the address memory area for the RAM 2 which was output in step d. After step d, the memory content of the address memory area for the RAM 2 is increased by "+1" (step e) and then [the maximum address value +1 of the RAM 2] stored in the ROM 22 and the memory content of the address memory area for the RAM 2 are compared to see if they coincide or not (step f). In step f, the acoustic signal data is checked to see if it was stored in the whole memory capacity of the RAM 2 or not. In step f, if [the maximum address value +1 of the RAM 2] is larger than the memory content of the address memory area for the RAM 2, the output of the detecting circuit 14 is detected to see if it is at a high potential or not (step g). When the output of the detecting circuit 14 is at a high potential, the acoustic signal is still supplying to the input terminal IN, so that the processings in steps c to g are repeatedly executed subsequently to step g.

In step f, if [the maximum address value +1 of the RAM 2] is equal to the memory content of the address memory area for the RAM 2, and when the output of the detecting circuit 14 is at a low potential in step g, the memory content of the address memory area for the RAM 2 is stored in the recording last address memory area (step h). Therefore, the content to be stored in the recording last address memory area in step h is [the recording last address +1]. Although the content of which the address at the end of recording was increased by "+1" is stored in the recording last address memory area, no problem will be caused because of a reason which will be described later.

After step h, the same value as the recording address initial value which was stored in the address memory area for the RAM 2 in step b is memorized as the playback address initial value (step i). After step i, the memory content of the address memory area for the RAM 2 is output as the address signal to the RAM 2, then the readout instruction signal is output to the RAM 2 (step j). The RAM 2 outputs the acoustic signal data stored in the address which was designated in response to the memory content of the address memory area for the RAM 2 which was output in step j. After step j, the signal for instructing the D/A conversion is output to the D/A converter 3 (step k). In response to this conversion instruction signal, the D/A converter 13 converts the acoustic signal data which was read out from the RAM 2 in step j into the analog signal and outputs it. This analog signal is smoothed by the low pass filter 16 and is output.

After step k, the memory content of the address memory area for the RAM 2 is increased by "+1" (step l), then the memory content of the recording last address memory area and the memory content of the address memory area for the RAM 2 are compared to see if they coincide or not (step m). When they are not equal, the processings in steps j to m are repeated until they coincide. Therefore, when the memory content of the recording last address memory area coincides with the memory content of the address memory area for the RAM 2 in step m, this means that all of the acoustic conversion data which had been stored in the RAM 2 in step d were read out. This is because [the playback address +1] corresponds to the memory content of the address memory area for the RAM 2 in step k although the value of [recording step +1] in step e has been memorized in the recording last address memory area in step h.

On the other hand, the set data of the setting device 19 to set the number of playback times has been memorized in the memory area to store the number of playback times which was provided in a predetermined address of the RAM 23 upon initialization prior to step a.

Whenever the memory content of the recording last address memory area coincides with the memory content of the address memory area for the RAM 2 in step m, "1" is subtracted from the memory content of the memory area of the number of playback times and the processings in steps i to n are repeated until the memory content of this memory area of the number of playback times becomes "0". When it becomes "0", the processing returns to step a and the apparatus waits for the recording start instruction signal (step n).

Therefore, the playback operations are repeated the number of times to be specified by the set data which was set in the setting device 19 to set the number of playback times. Upon playback, only all of the acoustic signal data which were memorized in the RAM 2 when recording are read out and reproduced. In the case where the acoustic signal data is not stored in the whole memory capacity of the RAM 2, the portion where no acoustic signal data is stored is not read out.

In addition, the playback operation may be H) performed only once by omitting the setting device 19 to set the number of playback times. In this case, step n is omitted in FIG. 4 and the program may be constituted such that the processing returns from step m to step a as indicated by the broken line.

In this embodiment described above, an example of the case where the recording start instruction and recording end instruction are obtained from the output of the detecting circuit 14 has been described. In such a case, the recording is started simultaneously when the learner begins to speak and the playback is started when he finishes speaking.

On one hand, as a modification of the present embodiment, it is also possible to use, as the recording instruct means, a change-over switch in which one contact is grounded and the other contact is pulled up to a power source ($+V_{cc}$) in place of the detecting circuit 14.

A second embodiment of the present invention will then be described with reference to FIG. 5. The recording/reproducing apparatus in the second embodiment is provided with the A/D converter means 1 for converting the input analog audio signal (i.e., acoustic signal) into the digital signal (i.e., acoustic signal data), the RAM 2 for storing the acoustic signal data converted by the A/D converter means 1, and the D/A converter means 3 for converting the acoustic signal data read out from the RAM 2 into the analog signal. In addition, the recording/reproducing apparatus of this embodiment further comprises: the recording instruct means 4 for instructing the recording; the write control means 5 for sequentially outputting the address signal and the write instruction signal to the RAM 2 in response to the output of the recording instruct means 4, thereby allowing the acoustic signal data which was converted by the A/D converter means 1 to be written in the RAM 2; recording capacity memory means 10 in which the capacity of the RAM 2 where the storage is possible was memorized; the readout control means 8 which sequentially outputs the address signal and readout instruction signal to the RAM 2 and allows the acoustic signal data stored in the RAM 2 to be read out; and playback start time determining means 9 for finishing the write instruction by the write control means 5 when the writing was performed in the whole recordable capacity which had been memorized in the recording capacity memory means 10 and for instructing the start of readout to the readout control means 8 when the recording instruct means 4 did not instruct the recording any more. The generation of the recording instruction by the recording instruct means 4 is sensed by the write control means 5, and the acoustic signal data converted by the A/D converter means 1 is H; sequentially stored in the RAM 2 in response to the address signal and the write instruction signal which were output from the write control means 5. In addition, whenever the write control means 5 writes, the capacity where the write has been completed and the capacity where the recording is possible which has been memorized in the recording capacity memory means 10 are compared by the playback start time determining means 9. When they are equal, the write instruction by the write control means 5 is finished, and at the same time and playback start time determining means 9 outputs the readout start instruction signal to the readout control means in response to the end of recording instruction by the recording instruct means 4. In response to this readout start instruction signal, the readout control means 8 sequentially outputs the address signal and readout instruction signal to the RAM 2, so that the acoustic signal data stored in the RAM 2 is sequentially read out from the RAM 2 and is supplied to the D/A converter means 3 and is converted into the analog signal.

Figure 5:
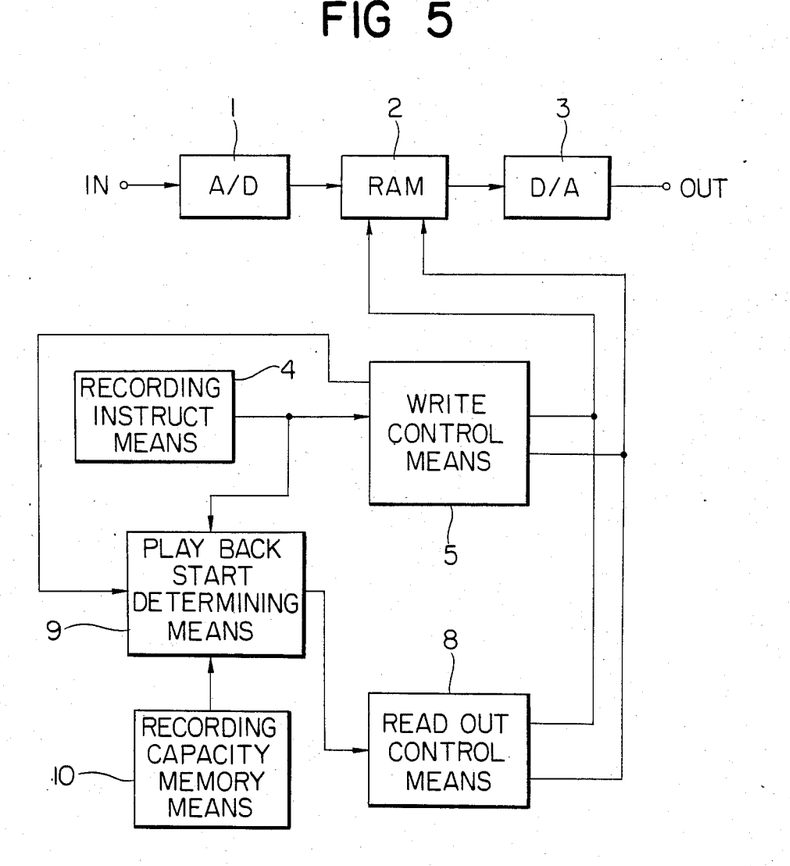
FIG. 5 is a function block diagram of another embodiment of the invention.
Figure 6:
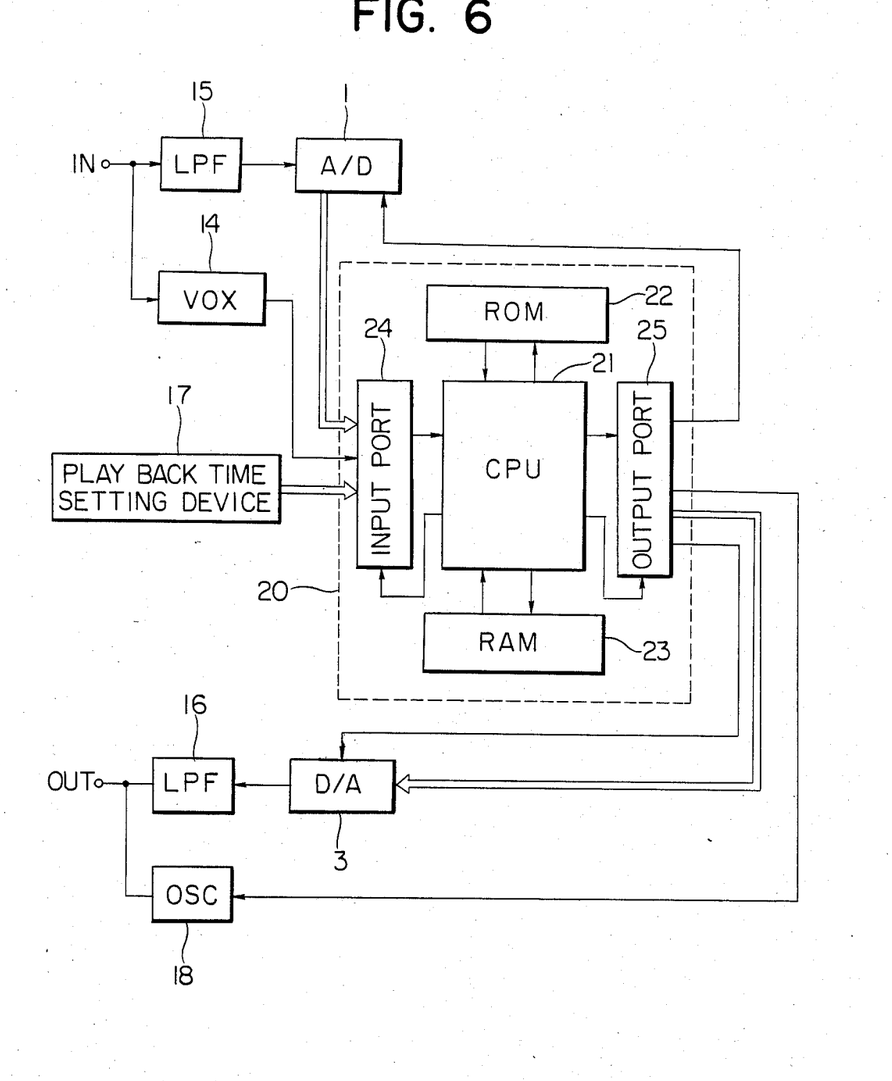
FIG. 6 is a block diagram showing a constitution of another embodiment of the invention.

FIG. 6 is a block diagram showing a constitution of the embodiment shown in FIG. 5.

The acoustic signal supplied to the input terminal IN is supplied to the A/D converter 1 through the low pass filter 15 to remove the foldover noise to be caused due to the sampling and is converted into the acoustic signal data.

In addition, the analog signal output from the D/A converter 3 is transmitted to the output terminal OUT through the low pass filter 16.

On the other hand, the microcomputer 20 fundamentally comprises the CPU 21, ROM 22, RAM 23 including the RAM 2, input port 24, and output port 25. The acoustic signal supplied from the input terminal IN is supplied to the acoustic signal detecting circuit, i.e., VOX circuit 14 for detecting the presence or absence of the acoustic signal. The output of the detecting circuit 14, the set data of a setting device 17 to set the number of playback times and the acoustic signal data which was output from the A/D converter 1 are supplied to the input port 24. The program to control the CPU 21 has been written in the ROM 22. In accordance with the program in the ROM 22, the CPU 21 reads out through the input port 24 the output of the acoustic signal detecting circuit 14, the set data of the setting device 17, and the acoustic signal data from the A/D converter 1 if necessary, then it stores into the RAM 23 or register, where the storage data is subjected to the processings for reception and transmission, discrimination, arithmetic operation, comparison, etc. In accordance with necessity and in dependence upon these processings, the CPU 21 transmits through the output port 25 the conversion instruction signal to the A/D converter 1; the conversion instruction signal and stored acoustic signal data to the D/A converter 3; a drive signal to drive a low frequency oscillator 18 for generating a warning sound, respectively.

As the acoustic signal detecting circuit 14, the circuit shown in FIG. 3 may be used.

Figures 7, 7A:
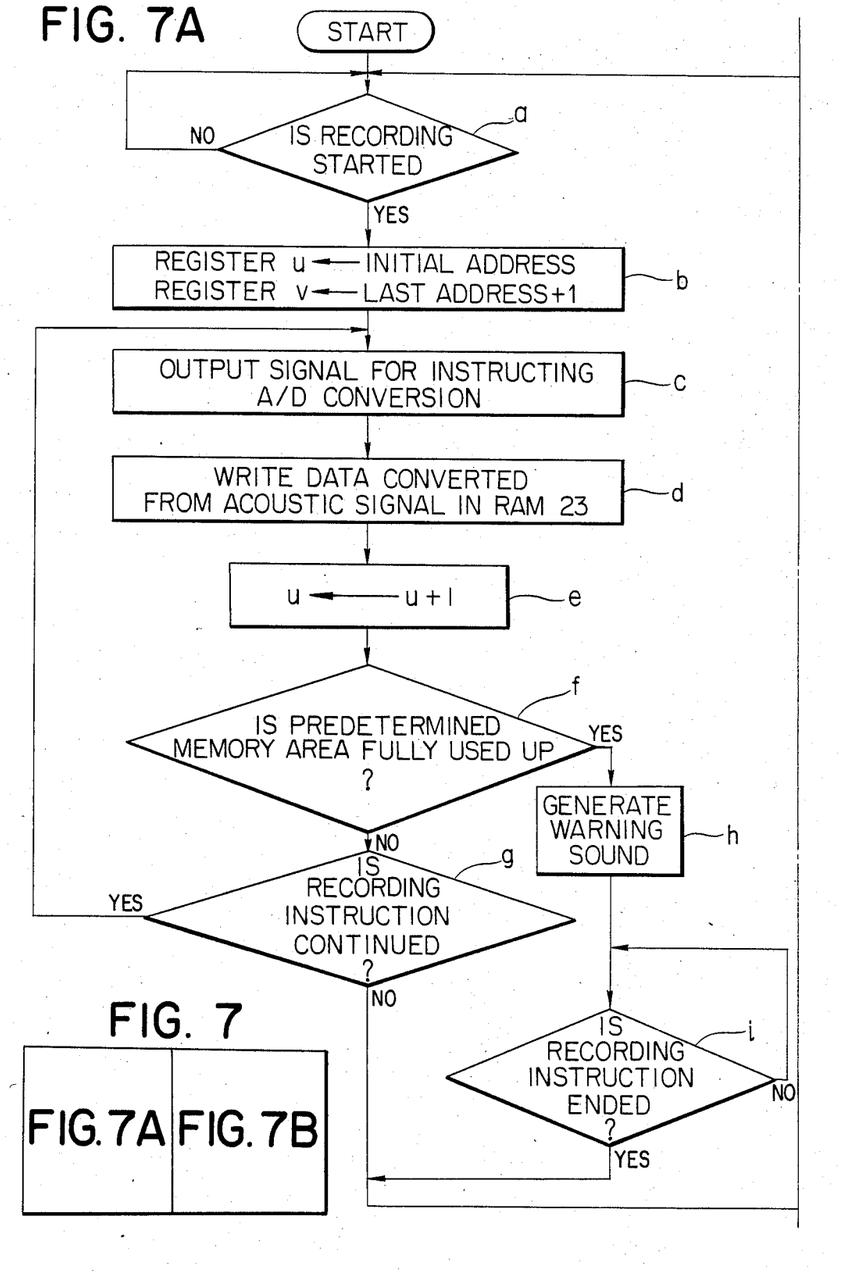
FIG. 7 composed of FIGS. 7A and 7B, is a flowchart to describe the operations of another embodiment of the invention.
Figure 7B:
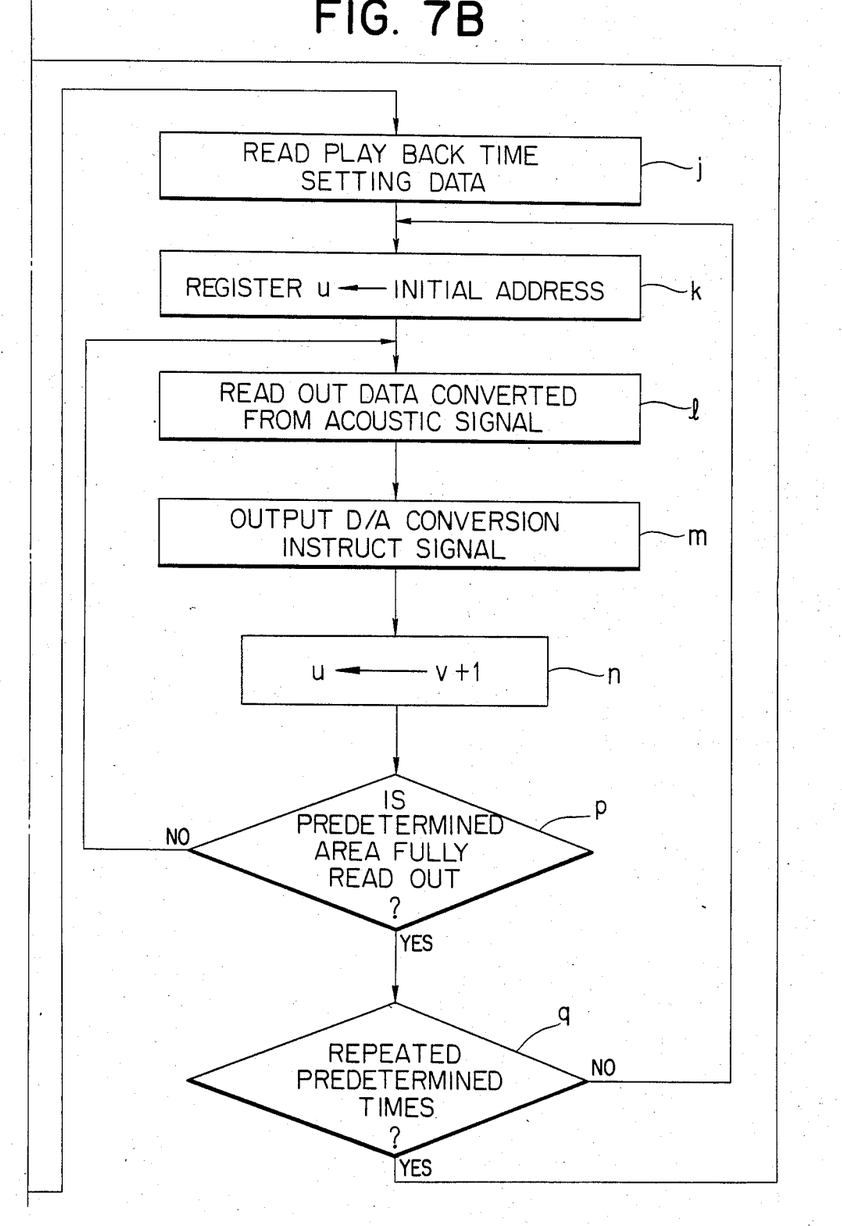

The operation in the second embodiment which was constituted in the manner as described above will now be described with reference to the flowchart shown in FIG. 7.

When the program written in the ROM 22 is operated, the apparatus is first initialized. In this initialization, an initial address value in the acoustic signal data memory area and [the last address value +1] are memorized in a predetermined area at least other than the acoustic signal data memory area in the RAM 23. Then, the apparatus waits for the recording start instruction from the acoustic signal detecting circuit 14, namely, it stands by until the output of the detecting circuit 14 becomes a high potential (step a). When the acoustic signal is supplied and the output of the detecting circuit 14 becomes a high potential, the initial address value and [last address value +1] which have been memorized in the RAM 23 in the initialization step are copied (hereinbelow, referred to as "transferred") respectively individually into registers u and v (step b). After step b, a signal for instructing the A/D conversion is output to the A/D converter 1 (step c). In response to this conversion instruction signal, the A/D converter 1 samples the acoustic signal supplied through the low pass filter 15 and converts the acoustic signal data. Then, the acoustic signal data converted by the A/D converter 1 is written into the address of the RAM 23 which was designated by the register u (step d); subsequently, the content of the register u is increased by "+1" (step e). Then, the content of the register u and the content of the register v is compared to see if they coincide or not (step f). In this step f, the acoustic signal data is checked to see if it was written into the whole acoustic signal data memory area in the RAM 23 or not. When [the content of the register v > the content of the register u] in step f, the output of the acoustic signal detecting circuit 14 is checked to see if it is at a high potential or not (step g). When the output of the detecting circuit 14 is at a high potential in step g, it means that the acoustic signal is still being supplied, so that after step g, the processings in steps c to g are repeatedly executed until [the content of the register v = the content of the register u].

When [the content of the register v = the content of the register u] in step f, this means that the acoustic signal data was written into the whole acoustic signal data memory area in the RAM 23, so that the processing advances from the loop in steps c to g and the drive signal is output to the low frequency oscillator 18 (step h). Thus, the low frequency oscillator 18 generates an oscillation output, i.e., the warning sound signal during the period when the drive signal is being generated due to the execution of the processing in step h. This warning sound signal is reproduced and the warning sound is generated, thereby informing that the writing operation in the whole recording capacity has been completed. After step h, the apparatus stands by until the output of the acoustic signal detecting circuit 14 becomes a low potential, namely, until the recording instruction is ended (step i).

When the output of the detecting circuit 14 becomes a low potential, i.e., when the end of recording instruction is detected in steps g and i, subsequently to steps g and i, the set data of the setting device 17 for setting the number of playback times is written in a predetermined area in the RAM 3 other than the acoustic signal data memory area, then the set data of the setting device 17 written is transferred to a register w (step j). After step j, the initial address value in the acoustic signal data memory area which has been memorized in the RAM 23 is transferred to the register u as the initial address value upon playback, thereby setting the playback address (step k). After step k, the acoustic signal data memorized in the address which was designated in dependence upon the content of the register u is read out (step l), then the D/A conversion instruction signal is output to the D/A converter 3 (step m). In response to this D/A conversion instruction signal, the D/A converter 3 once writes the acoustic signal data which was read out in step l into the register in the D/A converter 3 and converts this into the analog signal, then outputs to the output terminal OUT through the low pass filter 16. After step m, the content of the register u is increased by "+1" (step n). Next, the content of the register u and the content of the register v are compared to see if they are equal or not (step P). In step p, all acoustic signal data memorized in the acoustic signal data memory area in the RAM 23 are checked to see if they were read out or not. When [the content of the register v > the content of the register u] in step p, subsequently to step n, the processings in steps l to p are repeatedly executed until [the content of the register v = the content of the register u].

When [the content of the register v = the content of the register u] in step p, this means that all of the memory contents in the acoustic signal memory area in the RAM 23 were read out and reproduced, so that the processing advances from the loop of steps l to p. When the processing advanced from the loop of steps l to p in step p, the content of the register w is decreased by "−1" and the processings in steps k to q are repeated until the value of the register w becomes zero. When the content of the register w became zero, the processing advances from the loop of steps k to q and returns to step a, the apparatus stands by until the output of the acoustic signal detecting circuit 14 becomes a high potential (step q). Therefore, when the processing advanced from step q, this means that the playback operation was repeatedly performed the number of times designated in response to the set data of the setting device 17 to set the number of playback times. In the case where the playback operation is always done only once, the setting device 17 and steps j and q may be omitted; in such a case, the processing may be returned to step a when [the content of the register v=the content of the register u] in step p.

In addition, in this embodiment, there has been described an example of the case where the low frequency oscillator 18 is provided and the warning sound is generated when the acoustic signal data was written in the whole acoustic signal data memory area. However, the digital warning sound signal data of which the warning sound signal to be output from the low frequency oscillator 18 was A/D converted may be memorized in a predetermined area in the RAM 23 other than the acoustic signal data memory area, thereby reading out this in step h. On one hand, the generation of the warning sound may be omitted.

What is claimed is:

1. Speech recording/reproducing apparatus comprising:
    A/D converter means for converting an input analog speech signal into a digital signal;
    a read/write semiconductor digital memory for storing the digital signal from said A/D converter means;
    D/A converter means for converting digital signal read out from said memory to reproduce the speech signal;
    detection means for detecting that the input analog speech signal exists; and
    control means in response to the output of said detection means for writing the digital signal into said memory while the input analog speech signal exists until the store capacity of said memory is filled up, and for starting read-out of the digital signal from said memory with detection of the termination of the input analog speech signal.

* * * * *